(No Model.) 3 Sheets—Sheet 1.
F. C. A. MEIER.
APPARATUS FOR MANUFACTURING PLATES, TUBES, AND OTHER ARTICLES FROM CLAY, CEMENT, PLASTER OF PARIS, &c.
No. 323,190. Patented July 28, 1885.
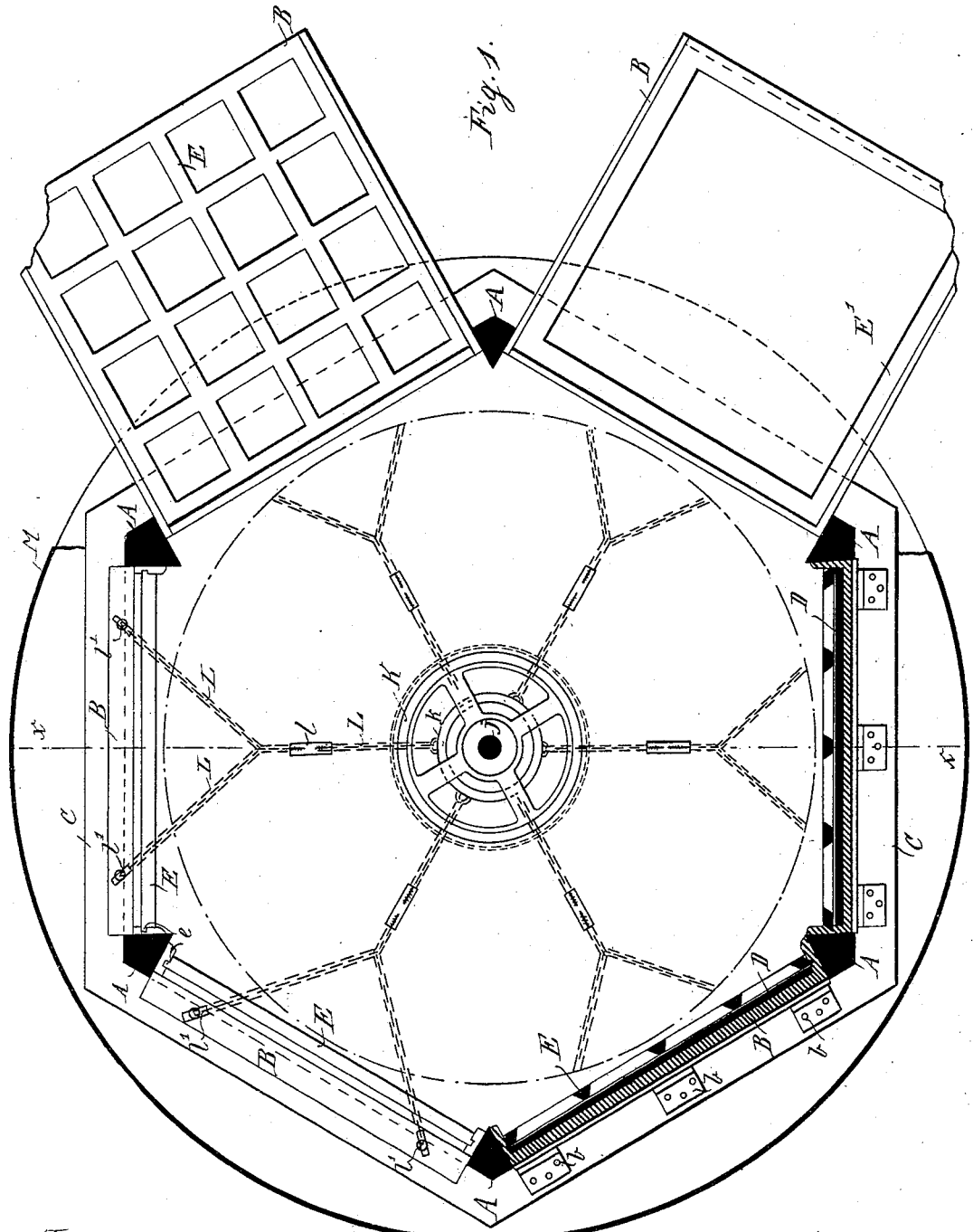

(No Model.)  3 Sheets—Sheet 2.
F. C. A. MEIER.
APPARATUS FOR MANUFACTURING PLATES, TUBES, AND OTHER ARTICLES FROM CLAY, CEMENT, PLASTER OF PARIS, &c.
No. 323,190. Patented July 28, 1885.
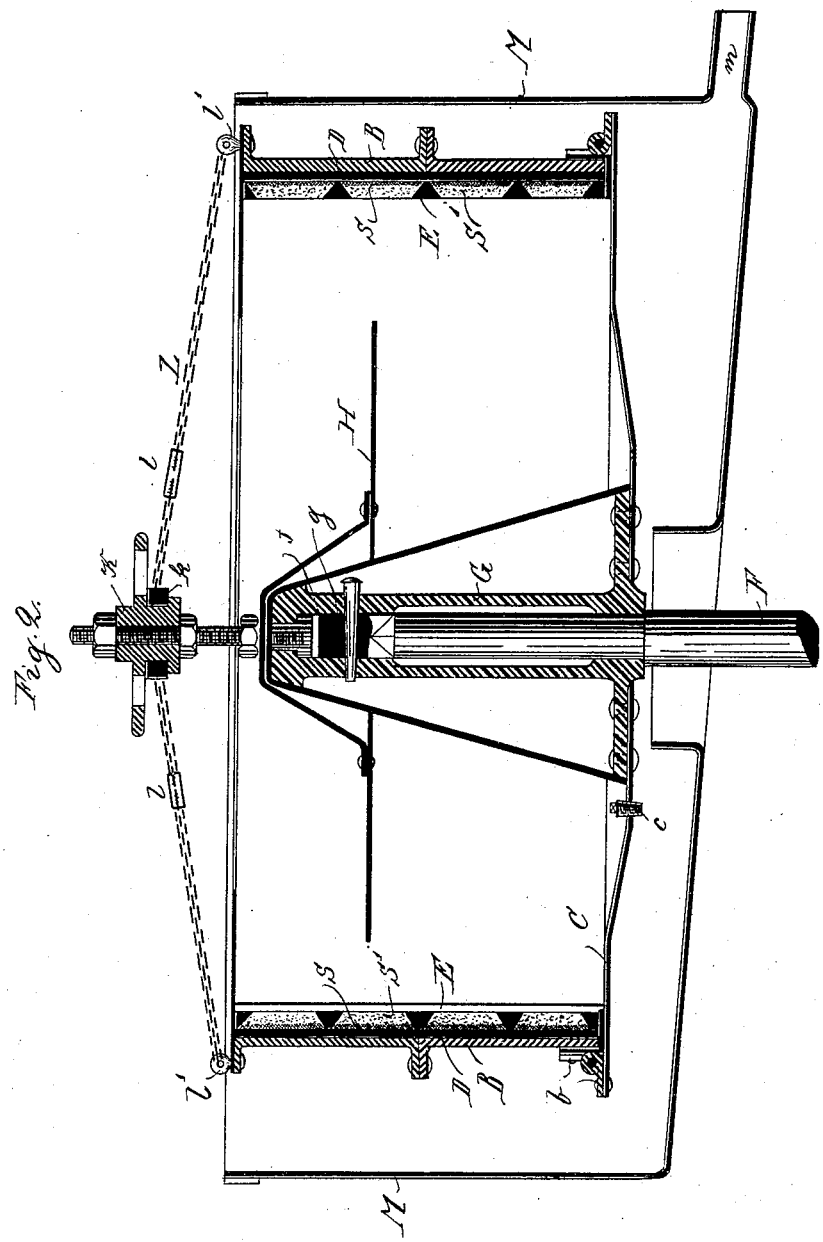
Attest:
J. Frank White
Leo. W. Duffy
Inventor:
Fridrich C. A. Meier
Washington, D.C.

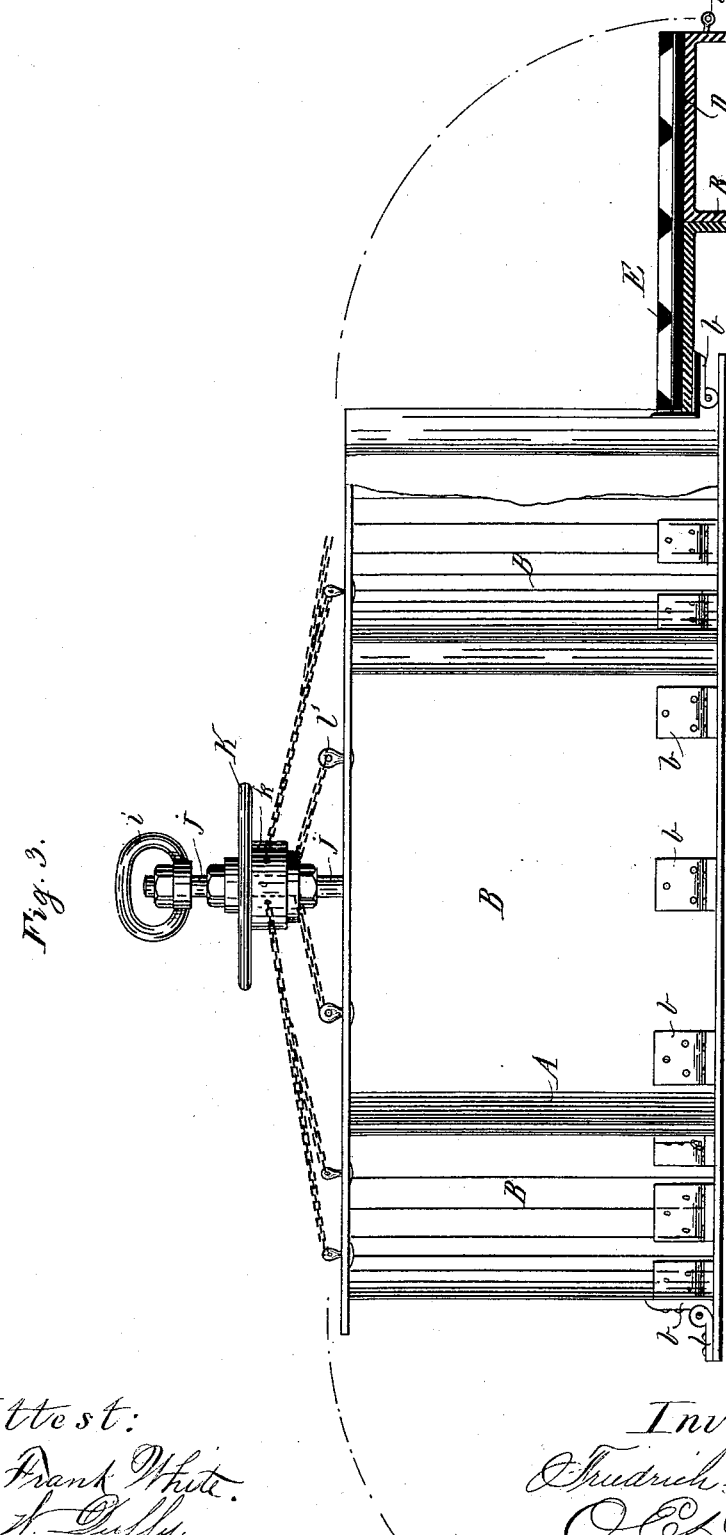

UNITED STATES PATENT OFFICE.

FRIEDRICH CARL ALBRECHT MEIER, OF WALKENRIED-ON-THE-HARZ, BRUNSWICK, GERMANY.

APPARATUS FOR MANUFACTURING PLATES, TUBES, AND OTHER ARTICLES FROM CLAY, CEMENT, PLASTER-OF-PARIS, &c.

SPECIFICATION forming part of Letters Patent No. 323,190, dated July 28, 1885.

Application filed February 6, 1885. (No model.)

*To all whom it may concern:*

Be it known that I, FRIEDRICH CARL ALBRECHT MEIER, of the city of Walkenried-on-the-Harz, Duchy of Brunswick, German Empire, have invented new and useful Improvements in Making Plates, Tubes, or other Plastic Objects of Cement, Clay, Gypsum, or a Mingling for Artificial Stone, by means of centrifugal machines constructed for these purposes, of which the following is a specification.

The improvements which form the object of this invention relate to an apparatus for manufacturing plates, tubes, or other articles from clay, cement, plaster-of-paris, and similar materials, whereby such objects or articles are made with a good surface polish, the polished layer consisting of a more firm, compact, dense, and harder mass than the layers underneath the polished one. The invention further relates to apparatus for said purpose—namely, to centrifugal apparatus employed in said process—which not only make the process continuous, but, as the walls of the centrifugal apparatus are capable of being folded down, the working will be more rapid and easy.

In the annexed drawings is shown the construction of a centrifugal "basket," readily removable from the upright driving-spindle, the walls of such basket being capable of being folded down.

Figure 1 is a plan of the same. Fig. 2 is a vertical section on line $x\,x$ of Fig. 1. Fig. 3 is a side elevation of the basket with one of its sides folded down.

The process of manufacturing plates, tubes, and plastic or other articles from clay, cement, plaster-of-paris, or artificial-stone compositions of all kinds consists, substantially, in first introducing a pasty or plastic substance of superior quality into the rapidly-rotating centrifugal apparatus, this superior material serving to form the polished surface; and when the centrifugal apparatus has driven this material into the molds placed into the sides thereof of another material for forming the body or underneath layers of the articles is introduced into the basket in suitable quantities, according to the thickness to be produced, the basket being allowed to continue its rotation for some time. The excess of water accumulates in the bottom of the basket, and is by a tap led to a safety-receiver and thence escapes. The whole basket is now lifted off the driving-spindle, another one is placed on the latter, and the material to be used is introduced into this basket, while the articles formed in the first will be removed, as will hereinafter be set forth.

The basket shown in Figs. 1 to 3 is hexagonal in outline. In the corners are fixed standards A A, between which there are six side walls, B, capable of being folded down. These sides B B of the basket are capable of being folded down outwardly, and are consequently attached by hinges $b\,b$ to the bottom C of the basket. The inner side of each such side is covered with a glass plate, D, held fast upon B by the mold-plates E, to be inserted into A. These mold-plates may be of various shapes, according to the nature of the articles to be produced—such, say, as large plates or small square or oblong tiles, and the like. In all cases, however, their outer frame is suitable for insertion into the recesses $e\,e$, Fig. 1, of the sides B. If large plates are to be made, the mold-plate E is transformed into the frame E'. (Shown in Fig. 1.)

The basket is fitted upon the driving-spindle F by means of a sleeve, G, secured upon the bottom of the former by means of the ribs $d\,d$. This may be effected, say, by the squared part $f$ on the spindle F, and a wedge or cotter, $g$, passing through the parts G and F. The lid H upon G serves to distribute the material fed into the basket.

To enable the basket to be readily removed from or placed upon the spindle F, the screw-bolt J, fixed in the sleeve G, is provided with a staple or eye, $i$, for attaching the chain of a lifting mechanism. The screw-bolt J also serves, in conjunction with the nut K and the tightening-chains L, fixed on the ring $k$ of the nut (which is capable of rotation,) to close the sides B B of the basket. The chains L are provided with a tightening-nut, $l$. M is the protecting wall or casing of the basket. The bottom of the casing is inclined, and at its side there is provided an exhaust-pipe, $m$, for the excess-water collected in the bottom of the basket from the plastic material. This water can be allowed to pass away by a cock or tap, c.

As hereinabove stated, the basket, while rotating at a high speed, is first charged with that material S which is to constitute the surface of the article to be produced, and afterward is introduced the material S' for forming the body or substance of said article.

When the desired thickness has been attained, the basket is stopped, raised out of the casing, the chains L are loosened by loosening the nut K, (screwing it downward,) the hooks of the chains are released from the eyes b' b', riveted to the sides, and the sides B B are folded down. The mold-plates E E are now removed either by being drawn out of the recesses e e of the sides B or by simply lifting off if other attachments of the mold-plates E to the sides B B have been provided. By causing the material S, which is first introduced, to be thrown against the smooth glass plate D, the surface of the article receives a fine firm polish, which, by previously painting or coloring the glass plate, may be marbled, stained, or made with a pattern.

If tubes are to be made by this means, then the basket and its sides will have to be suitably modified, retaining, however, the main features of the construction shown in Figs. 1 to 3.

I claim—

1. In a basket or centrifugal apparatus for the manufacture of articles from clay and other plastic materials, the folding sides B, jointed to the bottom C and controlled by chains L or equivalent device, substantially as specified.

2. In a basket or centrifugal apparatus for the manufacture of articles from clay and other plastic materials, a plate, D, of glass or other material capable of taking a fine surface, against which the plastic material is pressed by centrifugal force for the purpose of imparting a smooth surface to the said plastic material.

3. In a basket or centrifugal apparatus for the manufacture of articles from clay and other plastic materials, the combination, with the folding sides B, of mold-plates E or frames E', adapted to be attached thereto in any suitable manner.

4. In a basket or centrifugal apparatus for the manufacture of articles from clay and other plastic materials, the combination, with the folding sides B, of chains or equivalent device L, adapted to hook into eyebolts l', and provided with adjusting-nut and right and left handed screws l, screw-bolt J, and nut K, the whole constructed and operating substantially as and for the purpose specified.

5. In a basket or centrifugal apparatus for the manufacture of articles from clay and other plastic materials, and as a means of movably connecting the basket with its spindle or shaft F, the combination, with the said shaft, of the sleeve G, adapted to fit over the square f or be secured by the movable pin g, substantially as specified.

In testimony whereof I have hereto set my hand in the presence of two subscribing witnesses.

FRIEDRICH CARL ALBRECHT MEIER.

Witnesses:
ALEN SCHOLZE,
B. ROI.